United States Patent
Ikeda et al.

(10) Patent No.: US 6,835,077 B2
(45) Date of Patent: Dec. 28, 2004

(54) CARD CONNECTOR HAVING A CARD ENGAGING LOCKING MECHANISM

(75) Inventors: Keishi Ikeda, Kawasaki (JP); Junya Tsuji, Tokyo (JP)

(73) Assignee: Tyco Electronics AMP K.K., Kanagawa (JP)

( * ) Notice: Subject to any disclaimer, the term of this patent is extended or adjusted under 35 U.S.C. 154(b) by 0 days.

(21) Appl. No.: 10/092,676

(22) Filed: Mar. 12, 2002

(65) Prior Publication Data

US 2002/0127899 A1 Sep. 12, 2002

(30) Foreign Application Priority Data

Mar. 12, 2001 (JP) ......................................... 2001-069382

(51) Int. Cl.[7] ............................................. H01R 13/62
(52) U.S. Cl. ....................................... 439/159; 439/350
(58) Field of Search ............................... 439/159, 630, 439/328, 160, 310, 333, 345, 327; 361/798, 754

(56) References Cited

U.S. PATENT DOCUMENTS

| | | | | |
|---|---|---|---|---|
| 5,051,101 A | * | 9/1991 | Komatsu | 439/159 |
| 5,740,012 A | * | 4/1998 | Choi | 361/685 |
| 5,890,920 A | * | 4/1999 | David et al. | 439/157 |
| 6,071,135 A | * | 6/2000 | Obara | 439/159 |
| 6,270,365 B1 | * | 8/2001 | Nishioka | 439/159 |
| 6,382,995 B1 | * | 5/2002 | Bricaud et al. | 439/159 |
| 6,398,567 B1 | * | 6/2002 | Nishimura | 439/159 |

* cited by examiner

Primary Examiner—P. Austin Bradley
Assistant Examiner—Edwin A. Leon
(74) Attorney, Agent, or Firm—Barley Snyder Senft & Cohen, LLC

(57) ABSTRACT

A card connector having a lock member that engages with a card. It is constructed so that when a card is forcefully removed while in a locked state, neither the card nor the lock member is damaged. When a cutout of the card is engaged by the lock member, a free end portion of the lock member is positioned by a support surface of a housing, thereby preventing outward deformation thereof. If a force is applied to forcefully pull out the card while in this state, an engagement surface of the lock member is pushed by the cutout so that an engagement protrusion elastically deforms in a twisting manner, causing the engagement of the cutout therewith to be released.

18 Claims, 11 Drawing Sheets

CARD CONNECTOR HAVING A CARD ENGAGING LOCKING MECHANISM

FIELD OF THE INVENTION

The present invention relates to an electrical connector and more particularly to card connector having a lock member for engaging a card.

BACKGROUND OF INVENTION

Various types of card connectors having a lock member exist. An example of such a connector is disclosed in Japanese Patent No. 3065310. This connector has a slide plate that slides within the connector housing in an insertion direction for receiving a card. A card having a cutout in a lateral edge thereof is locked within the slide plate by the engagement of the cutout with a lock member. The lock member consists of a linear spring mounted in the connector housing.

In the conventional technology, the retention force of such lock members is high because the planar portion of the spring lock member engages with a planar portion of the card perpendicular to the insertion direction. In extracting the card, an excessive force may be exerted on the lock member, possibly damaging either the lock, the card or both.

SUMMARY OF THE INVENTION

It is an object of the invention to provide a card connector that does not damage the card or lock member when the card is forcefully extracted while in a locked state.

The card connector of the present invention has an insulative housing with a plurality of contacts for receiving a card; a slider slidably mounted in the housing capable of assuming an ejection position for ejecting the card from the housing and a card receiving position for receiving the card in the housing. A lock member is held by the slider for engaging a cutout on a lateral edge of the card to lock the card in the card receiving position. A positioning mechanism is provided for positioning the slider in the ejection position and the card receiving position. The lock member comprises a fixed end portion fixed on the slider and a free end portion. The free end portion is supported by contacting a support surface of the housing when in the card receiving position and separates from said support surface when in the ejection position. A spring piece is provided with an engagement protrusion for engaging the cutout. When the slider is in the ejection position, the free end portion flexes to disengage the engagement with the cutout of the card by the extraction of the card, and when the slider is in the card receiving position, the free end portion elastically deforms while contacting the support surface to disengage the engagement with the cutout by the forced extraction of the card.

DESCRIPTION OF THE PREFERRED EMBODIMENTS

The preferred embodiments of the card connector 1 according to the present invention will now be described in detail with reference to the attached figures.

Figure 1:
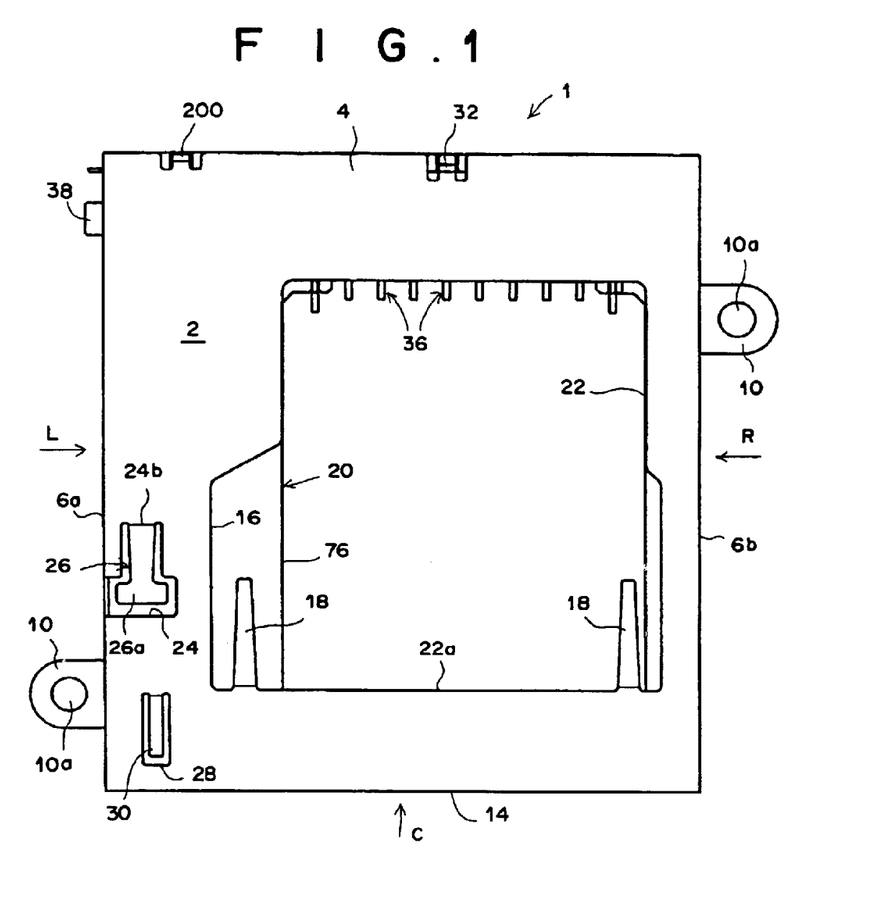
FIG. 1 is a plan view of the connector according to the present invention.

The connector 1 will first be described generally with reference to FIGS. 1 through 3. The connector 1 has a housing 20 formed of an insulative synthetic resin, and a shell 2 disposed over the housing 20. The connector has a card receiving portion 14 on the under side. A card 250 is insertable into this card receiving portion 14 in the direction indicated by the arrow C. The shell 2 is formed by stamping and forming a metal material, preferably a copper alloy. The shell 2 has a substantially rectangular opening 22 disposed right of center in its major surface 4, and tabs 10 for fixing the connector 1 to a mounting member 8 of a circuit board or the like. The tabs 10 extend from side walls 6a and 6b of the shell 2. The tabs 10 have mounting apertures 10a, and one is provided on each side wall 6a and 6b, positioned so as to be shifted from each other front to back.

A cutout 16 is formed on the left of the opening 22. Tongues 18 extend rearward from both sides of the terminal edge 22a near the card receiving portion 14 of the opening 22. These tongues 18 are slightly bent towards the card receiving portion 14 to elastically engage the outer surface of an inserted card 250. These tongues 18 act as brakes during ejection of the card 250, to prevent the card 250 from ejecting at excessive speeds.

An opening 24 shaped as an inverted T is formed on the major surface 4 of the shell 2, near the side wall 6a. A similarly shaped spring arm 26 that extends from the rear edge 24b of the opening 24 towards the front of the connector 1 is formed within the opening 24. The tip 26a of the spring arm 26 is formed as a cantilevered wide rectangular portion which is urged towards the interior of the connector 1. A rectangular opening 28 is formed in the shell 2 forward of the spring arm 26. A similarly shaped elongate latch arm 30 is formed within the opening 28. The function of this latch arm will be described later. A fixing portion 32 for fixing the shell 2 to the housing 20 is positioned towards the center of the rear end portion of the shell 2. The fixing portion 32 will be described later. Also, positioned at the rear end of the shell 2, towards the side wall 6a, is a detection portion 200 that operates during insertion and extraction of the card 250. A tab 38, cut out and raised from the shell 2, is utilized as an electrode in the detection of the card 250.

Figure 2:
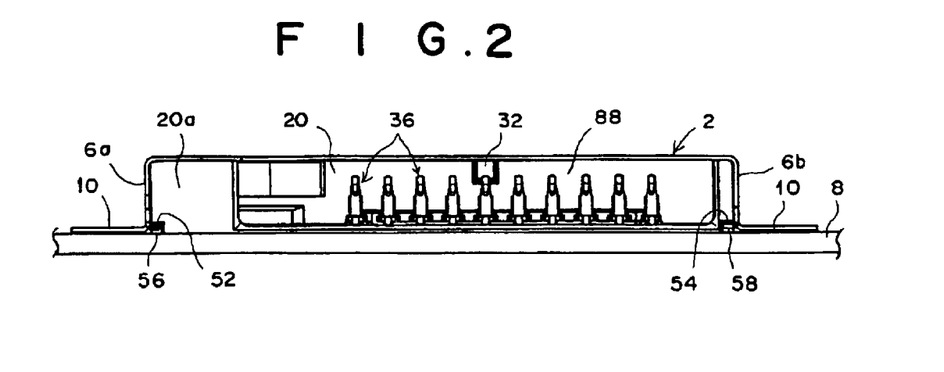
FIG. 2 is a front view of the connector shown in FIG. 1.

The tab 38 is connected to a conductive pad, not shown in the figure, of the mounting member 8 (FIG. 2).

Figure 3:
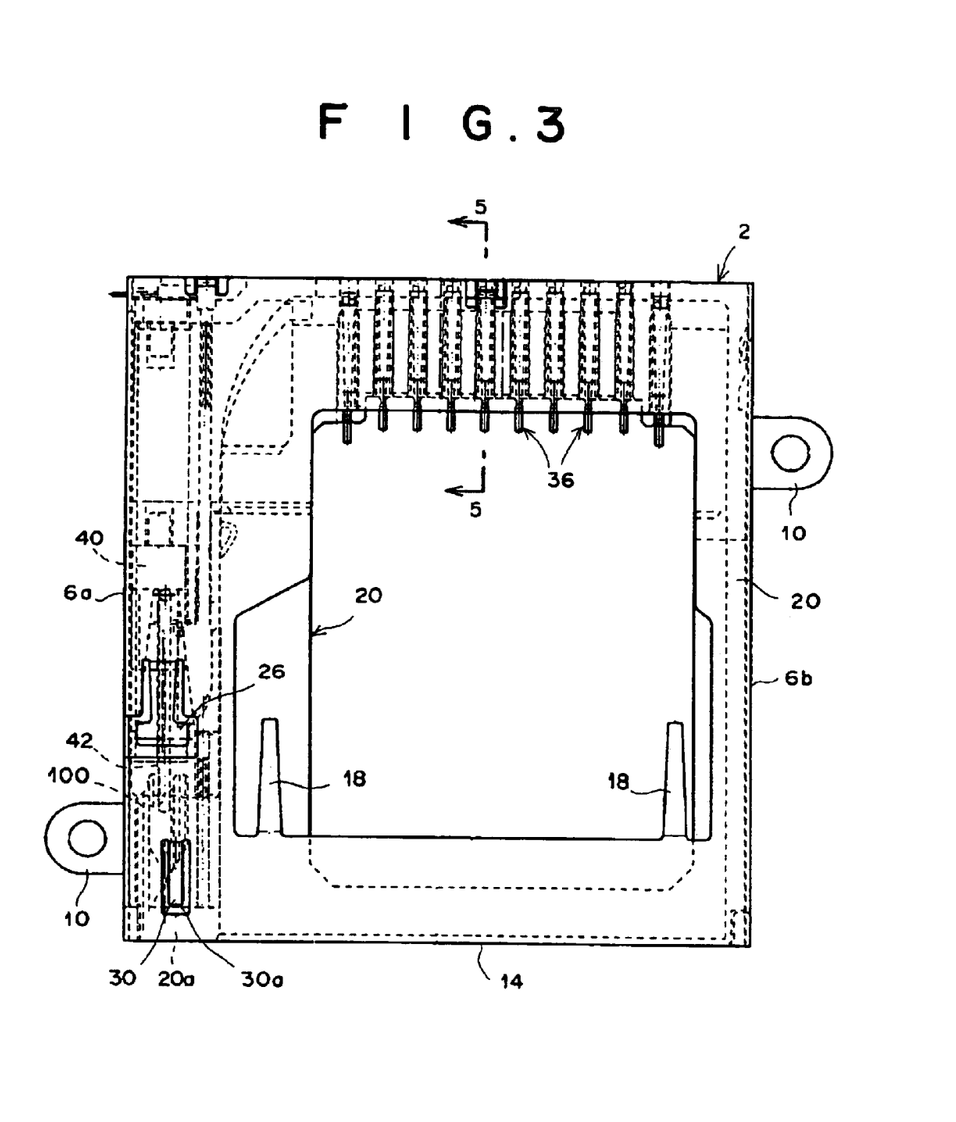
FIG. 3 is a transparent plan view of the connector shown in FIG. 1.

As shown in FIGS. 2 and 3, the shell 2 is arranged over the housing 20 such that a plurality of contacts 36 are arranged in a row along the rear portion of the housing 20. There is a space between the contacts 36 and the major surface 4 of the shell 2, into which the card 250 is inserted while causing the contacts 36 to flex. A slider 40 that slides along the housing 20 in the insertion direction is provided on the left side of the housing 20 near the side wall 6a. The slider 40 slides inward its upper surface and its lateral surface are pressed by the shell 2. A metal cam follower 42 is provided on the slider 40. This cam follower 42 is constructed so as to move with the slider 40.

A cam groove 100 is formed on the housing 20 forward of the slider 40. The cam follower 42 is structured to move within the cam groove 100 according to the movement of the slider 40. At this time, the cam follower 42 is held in the slider 40 by the spring arm 26, formed integrally with the shell 2, so that it will not be pulled out therefrom. The latch arm 30 positioned forward of the spring arm 26 prevents the shell 2 from being pulled out toward the front when the housing 20 and the shell 2 are engaged. The front end 30a of the latch arm 30 engages the front wall 20a of the housing 20.

Figure 4A:
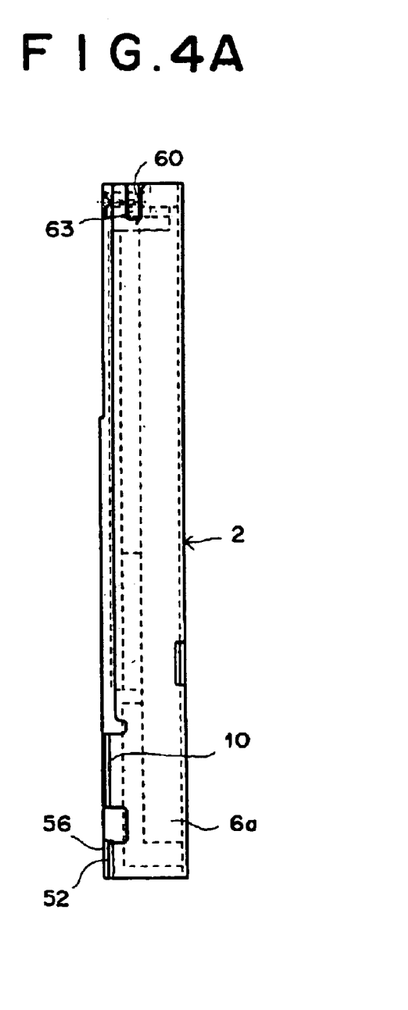
FIG. 4A is a left side view of the connector of FIG. 1 taken from the direction of arrow L of FIG. 1.
Figure 4B:
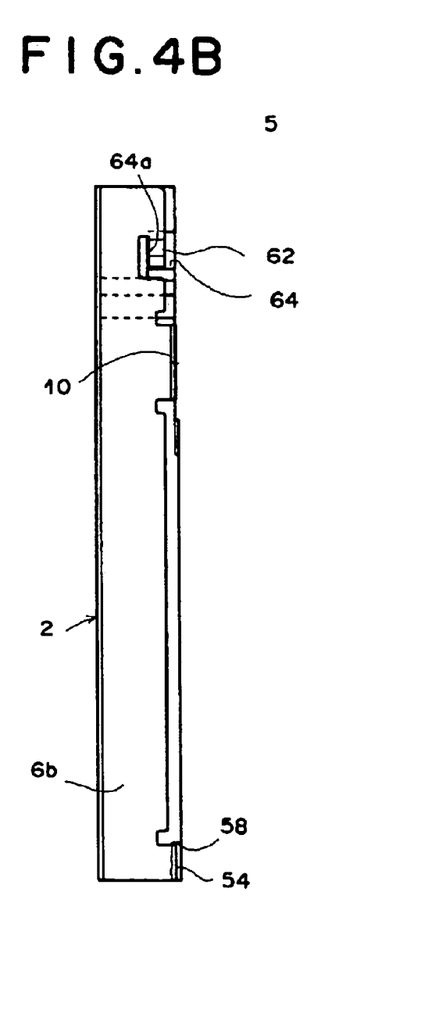
FIG. 4B is a right side view of the connector of FIG. 1 taken from the direction of arrow R of FIG. 1.

The mounting relationship between the housing 20 and the shell 2 will be described with reference to FIGS. 4 and 5. Claws 52, 54 are bent inward at the front lower edge of side walls 6a, 6b to engage corresponding recesses 56, 58 formed in the housing 20 respectively. This prevents the front portion of the shell 2 from lifting off of the housing 20. In addition, with regard to the rear portion of the shell 2, a rectangular cutout that opens to the rear is formed in the side wall 6a, and a rectangular protrusion 63 formed on the housing 20 is press fit within the cutout 60 to engage therewith. This prevents the shell 2 from moving backwards or upwards in relation to the housing 20.

Further, a front facing latch arm 62 is formed at the rear lower edge of the side wall 6b, which engages an engagement groove 64 formed in the housing 20. The engagement groove 64 is partially formed in a side wall 86 of the housing 20. This prevents forward movement of the shell 2 in relation to the housing 20 by the tip of the latch arm 62 contacting the engagement groove 64. Also, upward movement of the shell is prevented by the lateral surface of the latch arm 62 abutting an upper wall 64a. The fixing portion 32 is formed at the rear portion of the major surface 4 of the shell 2. This fixing portion 32 has a perpendicular portion 32a formed by bending the shell 2 in an L shape, and a tip portion 66 that extends rearward, parallel to the major surface 4. An engagement aperture 68 is formed in the housing 20 at the position corresponding to the tip portion 66, and the tip portion 66 is inserted into the engagement aperture 68 to engage therewith. These elements secure the housing 20 to the shell 2 so that the shell 2 does not disengage from the housing 20 in a rearward or vertical direction.

Figure 5:
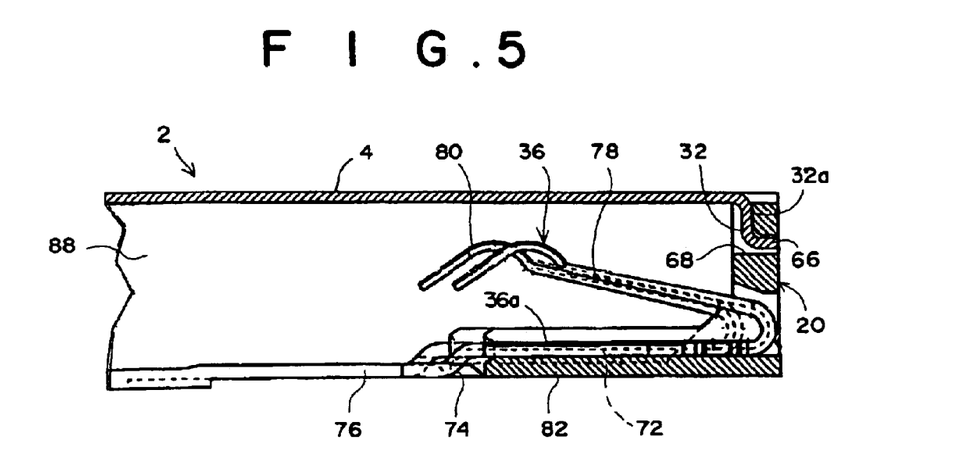
FIG. 5 is a magnified sectional view of the contact mounting portion taken along the line 5—5 of FIG. 3.

FIG. 5 clearly shows the housing 20 having the contacts 36 mounted thereon. The contacts 36 are formed in a substantially U shape. The main bodies 36a of the contacts 36 are fixed by being press fit in grooves 72 formed in the bottom wall 82 of the housing 20, and tines 74 are structured to protrude within openings 76 formed in the bottom wall 82 of the housing 20 for electrical connection with the mounting member 8 (FIG. 2). Contact arms 78 having resilient contact portions 80 that curve toward the interior then extend towards the exterior at the tips thereof. These contact portions 80 are to be electrically connected to the contact points of the card 250 to be inserted. The contacts 36 are positionally staggered so that when the card 250 is inserted, first the forward contacts 36 electrically connect with the grounding contact points of the card 250, then the rearward contacts 36 connect with the signal contact points of the card 250.

Figure 6:
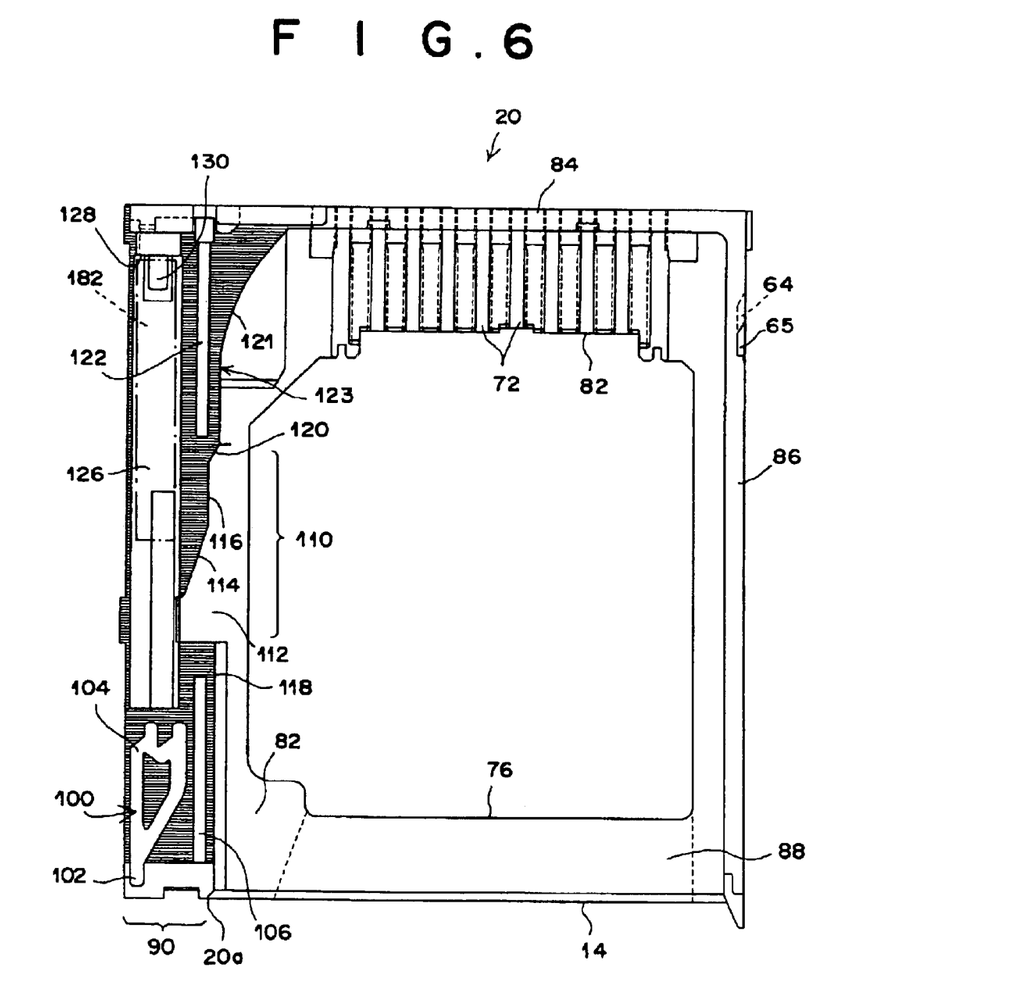
FIG. 6 shows a plan view of the housing similar to FIG. 3.

FIG. 6 shows a plan view of the housing 20 similar to FIG. 3. FIG. 6 is a plan view of the same housing 20 as that of FIG. 3. The housing 20 has a bottom wall 82, a rear wall 84 and a side wall 86 that extend upward from the bottom wall 82, and a slider mounting portion 90, where the slider 40 is to be mounted, on the side opposite side wall 86. Note that in order to clearly distinguish the mounting portion 90, the area corresponding to the mounting portion 90 has been shaded in the figure. The front end of the housing 20 is open, and constitutes a portion of the card receiving portion 14 to which the card 250 is inserted.

A substantially rectangular opening 76 is formed in the bottom wall 82 of the housing, similar to the opening 22 of the shell 2. A plurality of contact receiving grooves 72 are arranged along the rear portion of the bottom wall 82. An clearance space 65 is formed in front of the engagement grove 64 in the side wall 86. This clearance space 65 serves to prevent interference between the latch arm 62 and the housing 20 by positioning the latch arm 62 of the shell 2 with the clearance space 65 when the shell 2 is placed on the housing 20 so that the latch arm 62 travels along the clearance space 65. Then, the shell 2 is moved backwards to finally assemble the shell 2 and the housing 20.

A cam groove 100 is provided at the front end portion of the mounting portion 90, positioned with its convergent portion 102 towards the front of the connector 1 and its wide portion 104 towards the rear. The details of this cam groove 100 will be described later. A guide groove 106 that extends in the insertion direction is formed in the vicinity of the cam groove 100 in the interior of the housing 20. The length of the guide groove 106 is slightly longer than the length of the cam groove 100. The guide groove is formed directly behind the front wall 20a of the housing 20. A cam portion 110 is formed close and to the rearward of the guide groove 106. A cutout 112 that is open to the interior is formed in the cam portion 110. A cam surface 114 that tilts within the cutout 112 is formed on the housing 20. Moving from front to rear, the cam surface 114 is angled or tapered towards the interior of the housing. A support surface 116 that faces the interior is formed to extend from the cam surface 114. Further, a curved surface 121, curved according to the shape of the card 250, extends from the support surface 116 via a step portion 120.

Another guide groove 122 that is formed close to the support surface 116 and to the rear of the cam portion 110. The guide groove 122 and the guide groove 106 serve to guide the slider 40.

A spring housing groove 126 is formed to the outside of the cam portion 110 and the guide groove 122. A compression coil spring (hereinafter referred to as coil spring) 182 (FIG. 6), for urging the slider 40 in the extraction direction is provided in the spring housing groove 126. A forwardly facing protrusion 130 is formed on the rear wall 128 of the spring housing groove 126, and one end of the coil spring 182 is placed around the periphery of thereof. The spring housing groove and the protrusion 130 constitute a part of the mounting portion 90.

The cam groove 100 will be described in detail with reference to FIG. 7.

Figure 7A:
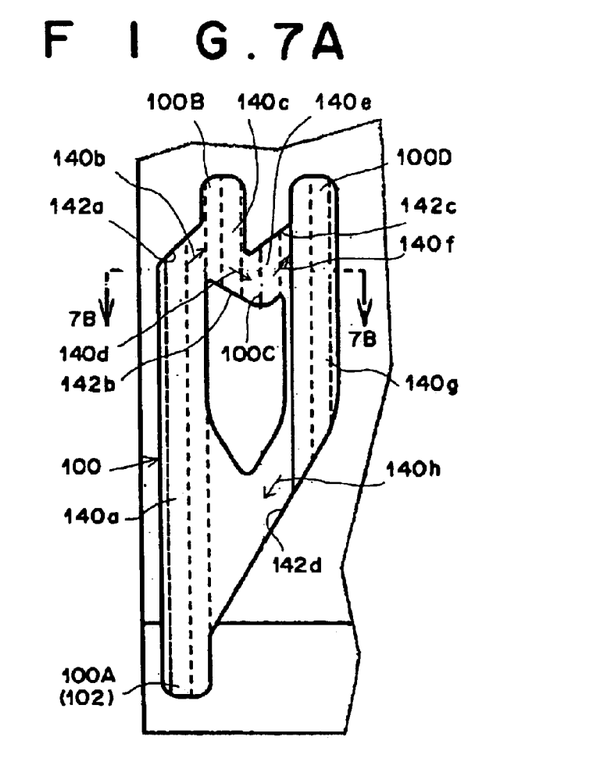
FIG. 7A is a magnified plan view of the cam groove.
Figure 7B:
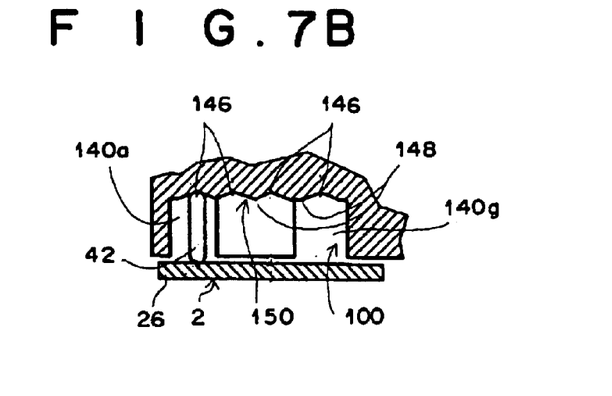
FIG. 7B is a sectional view of the cam groove taken along the line 7B—7B of FIG. 7A.

FIG. 7A and FIG. 7B show the cam groove 100. The cam groove 100 is formed by four parallel linear paths extending in the front-rear direction, and an oblique path that connects these paths. Specifically, the linear paths comprise a path 140a, which extends rearward from a terminal portion 100A (engagement release position) which becomes the convergent portion 102; a path 140c adjacent to the path 140a on its inner side which extends parallel thereto through a terminal portion 100B; a path 140e adjacent to the path 140c on its inner side which extends parallel thereto through a terminal portion 100C (engagement position); and a path 140g adjacent to the path 140e on its inner side which extends parallel thereto through a terminal portion 100D.

These linear paths are connected by paths 140b, 140d, 140f, and 140h indicated by the arrows in the figure. The paths 140b, 140d, 140f, and 140h are formed by oblique surfaces 142a, 142b, 142c, and 142d, which are provided as linear guides for connecting the linear paths 140a, 140c, 140e, and 140g to each other sequentially. By this construction, a circulating path is formed wherein the cam follower, that is, the cam follower 42, travels in a clockwise direction with terminal portion 100A as the starting point.

As shown in FIG. 7B, peaks and valleys are alternately provided within the cam groove 100. Specifically, valleys 146 are formed extending in the front-rear direction in the centers of the four linear paths 140a, 140c, 140e, and 140g. Peaks 148 are formed between the adjacent valleys 146 and parallel thereto.

Note that as can be seen in FIG. 7A and FIG. 7B, as the cam follower 42 travels within cam groove 100, when it travels from one linear path to the next adjacent linear path, it is guided by the oblique surfaces 142a, 142b, 142c, and 142d to pass over the peak 148. This, in combination with the fact that the slider 40 is urged forward by the coil spring 182, prevents reverse movement of the cam follower 42. Also, as can be seen in FIG. 7B, the upper portion of cam follower 42 is urged by the spring arm 26 of the shell 2, so that it can travel along an uneven valleys 146 and the peaks 148 along the bottom surface 150 of the cam groove 100. The relationship between the slider 40 and the cam groove 100 will be described in detail later.

Next, the slider 40 will be described with reference to FIG. 8. As shown in FIGS. 8A–8C, the slider 40 has a planar rectangular shape. A curved extension 154 is formed at the rear end of the slider 40 on its inner side. A protrusion 156 having a forward facing abutting surface 156a is formed sideways at the tip of the extension 154 on its inner side. The curvature of the extension 154 is similar to that of the corresponding portion of the card 250.

A cam rod positioning portion 160 is constructed at the front portion of the slider 40. A lock member attaching portion 170, for attaching a lock member 176 that locks the card 250, is formed between the central portion and the rear portion of the slider 40. An upwardly facing flat surface 162 is formed on the cam rod positioning portion 160, and an aperture 168 for housing a terminal portion 42a of the cam follower 42 is provided towards the outer side through the rear portion of the flat surface 162. Walls 164, 166 with slanted inner surfaces that extend from the rear portion of the flat surface 162 forward are formed on either side of the flat surface 162 so as to sandwich the aperture 168 therebetween. The slanted surfaces 164a, 166a of the walls 164, 166 are structured so that the region that they define increases in width towards the front end thereof. A front end 164b of the wall 164 is positioned rearward of a front end 172 of the slider 40. The front end of the wall 166 extends to the front end 164b of the wall 164, and then extends further to the front end 172 at a uniform width.

Figure 8A:
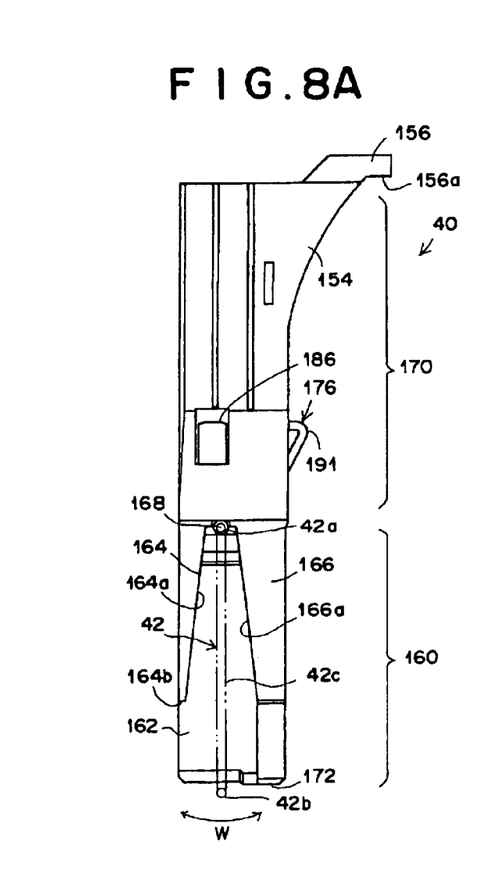
FIG. 8A is a plan view of the slider.

The cam follower 42, as shown most clearly in FIG. 8A, is formed in a substantially U-shape with short end portions by bending both ends of a metal wire having a circular cross section to substantially the same length. A bent end portion 42a at one end of the cam follower 42 is inserted into the aperture 168, a main body 42c is positioned on the flat surface 162, and an end portion 42b extends beyond the front end 172 of the slider 40 and is positioned to the outer side thereof. By this positioning, the end portion 42b is movable to the right and left as indicated by the arrow W at the front end portion of the slider 40. The end portion 42b circulates within the cam groove 100 and moves the slider 40 forward and backward, thereby positioning the slider 40 in the card receiving position for receiving the card 250 and the card ejection position for ejecting the card 250. Accordingly, the cam follower 42, the cam groove 100, as well as the members associated therewith, construct the positioning mechanism.

Figure 9:
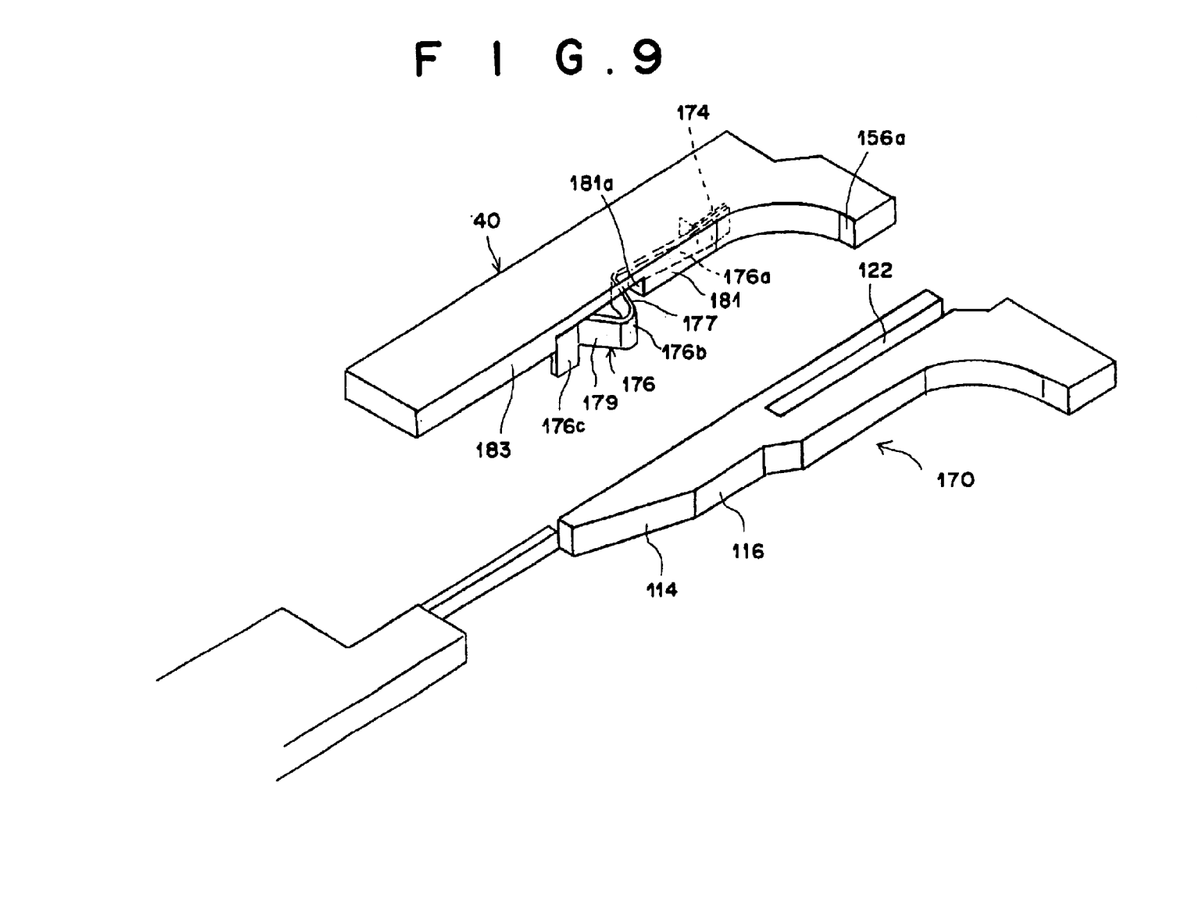
FIG. 9 is a schematic perspective view that shows the slider having the lock member attached thereto, and partially shows the mounting portion to which the slider is to be mounted.

A groove 174 is formed on a lower surface 155 of the extension 154. The lock member 176 is press fit and fixed within this groove 174. A detailed description of the lock member 176 will be given with reference to FIG. 9. FIG. 9 shows the slider 40 having the lock member 176 attached thereto, and partially shows the mounting portion 90 to which the slider 40 is to be mounted. The lock member 176 is a metal plate formed to have a linear arm 176a, an engagement protrusion 176b that curves to the side from the arm 176a, and a wide free end portion 176c that extends forward from the engagement protrusion 176b. The engagement protrusion 176b has a rear facing engagement surface 177 and a guide surface 179 that extends forward obliquely.

The groove 174 of the extension 154 extends forward from the rear end 188 of the slider 40, and the rear fixed portion of the arm 176a is received therein. One side of the extension 154 extends forward to form a regulating wall 181. The purpose of this regulating wall 181 is to regulate the degree of flex of the lock member 176 towards the inside of the housing. The engagement protrusion 176b extends beyond an inner lateral edge 183 of the slider from a front end 181a of the regulating wall 181. As there is no other wall on the side opposite the regulating wall 181, the lock member 176 is free to flex opposite the regulating wall 181. That is, it is free to flex to release the card 250.

A spring housing groove 178 (see FIG. 178C) is formed in the lock member lock member attaching portion 170 (see FIG. 8A) at a position corresponding to the spring housing groove 126 of the housing 20. The coil spring 182 is arranged within the cylindrical space formed by the spring housing groove 126 and the spring housing groove 178. A protrusion 186 is formed on a rear facing wall 184 at the front end of the spring housing groove 178 facing the protrusion 130 formed in the housing 20. The coil spring 182 is arranged around both of these protrusions 130 and 186 and is held between the front facing rear wall 128 (see FIG. 6) of the housing 20 and the rear facing wall 184 of the slider 40 in a compressed state.

Note that ribs 190, 192 are formed on the slider 40 the near of the front end 172 and in the rear portion thereof, in positions corresponding to the guide grooves 106, 122. These ribs 190, 192 are arranged so that they are movable within guide grooves 106, 122 of the housing 20 and act as guides for the motion of the slider 40 on the mounting portion 90.

Figure 10:
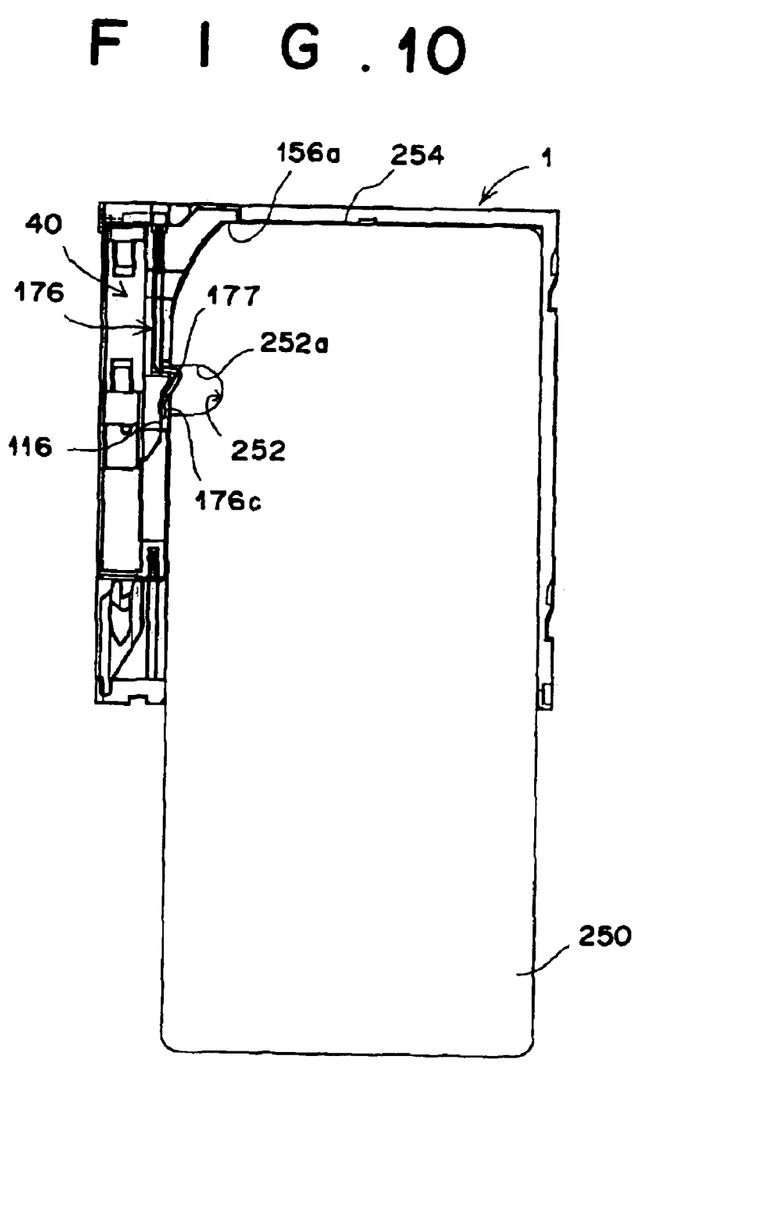
FIG. 10 is a plan view showing the card is completely inserted within the connector.
Figure 11:
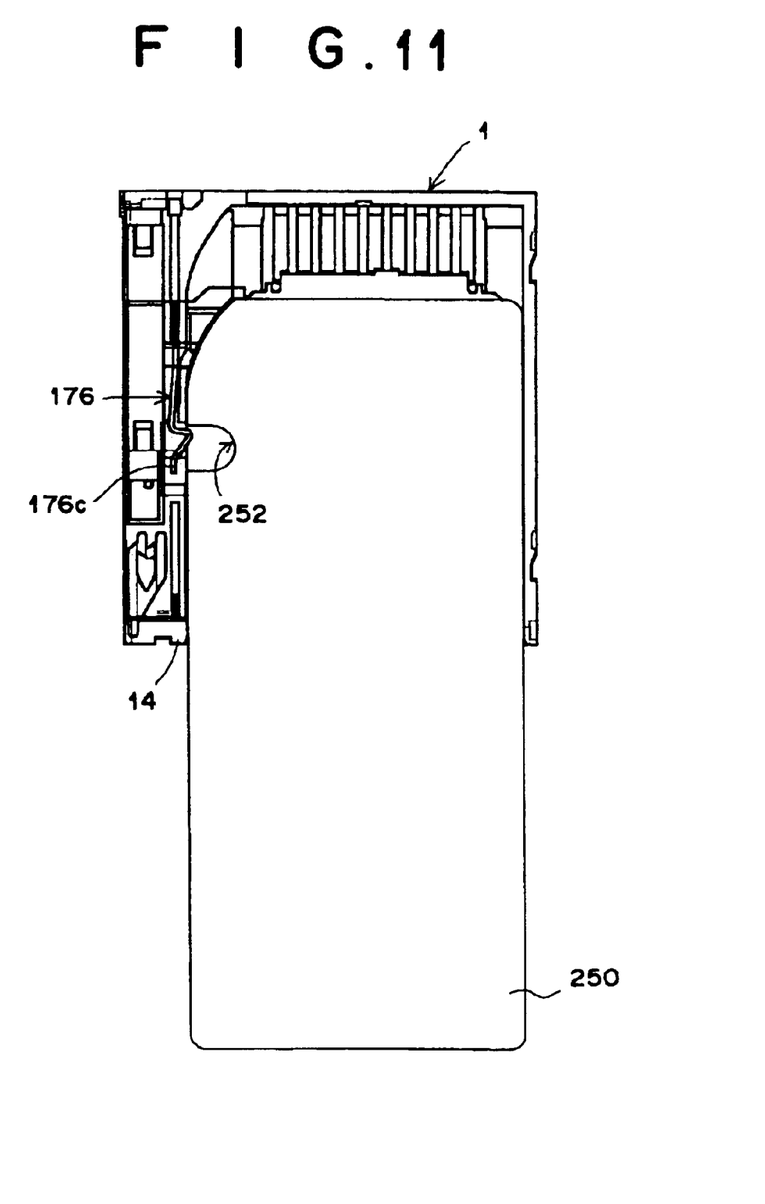
FIG. 11 is a plan view similar to FIG. 10 showing the card 250 being extracted from the connector.
Figure 12:
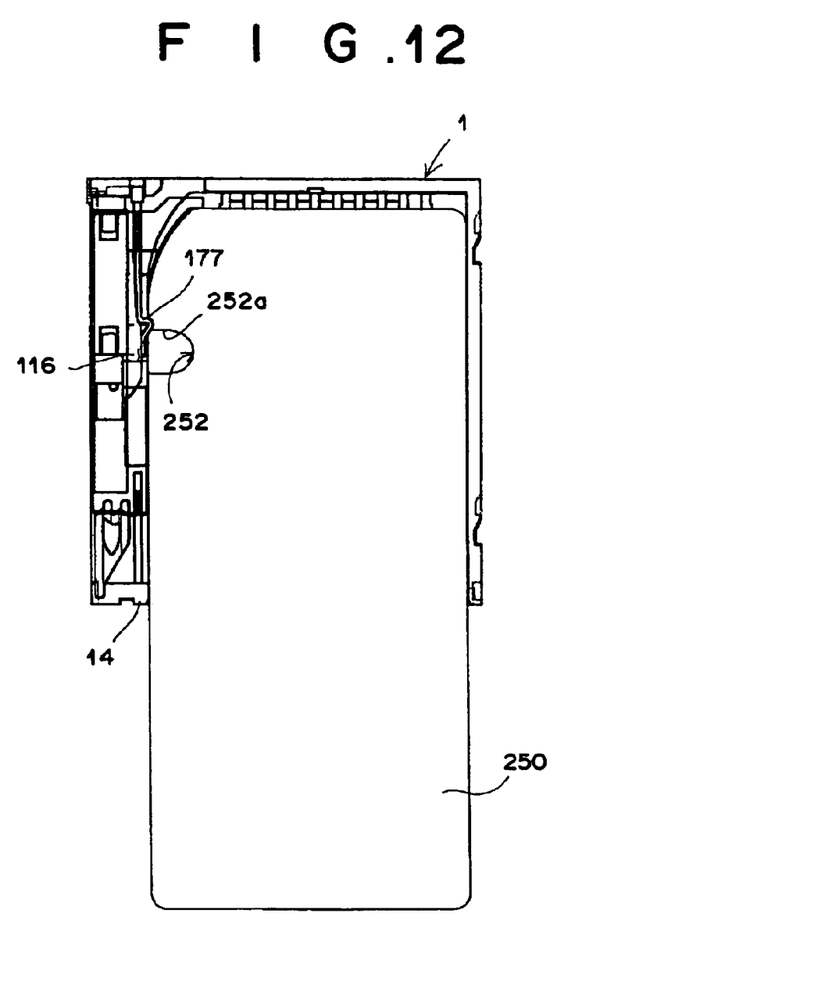
FIG. 12 is a plan view similar to FIG. 10 showing the card being forcibly extracted while in a locked state.

Next, the operation of the slider 40 will be described. FIGS. 10–12 show the operation of the slider 40 within the connector 1. FIG. 10 is a plan view of a state in which the card 250 is completely inserted within the connector 1, FIG. 11 is a plan view similar to FIG. 10 of a state in which the card 250 is being extracted from the connector 1, and FIG. 12 is a plan view similar to FIG. 10 of a state in which the card 250 is forcibly extracted while in a locked state.

The following description will be given with reference to FIG. 3, FIG. 7, FIG. 8, FIG. 10, and FIG. 12. The end portion 42b of the cam follower 42 is positioned at the terminal portion 100A of cam groove 100 shown in FIG. 7 when the slider 40 is in its initial state before the card 250 is inserted, that is, the engagement release position. At this time the slider 40 is positioned at its forwardmost position. In this initial state, the free end portion 176c of the lock member 176 is positioned at the cam surface 114, which is separated from the support surface 116 of the housing 20 in the card insertion/extraction direction. The free end portion 176c is not in contact with the cam surface 114, so the free end portion 176c of the lock member 176 is free to flex towards the outside.

Next, the card 250 is inserted into the connector 1. When the card 250 is urged towards the interior so that the leading end 254 of the card 250 abuts the abutting surface 156a of the slider 40, the position shown in FIG. 10 is assumed. The end portion 42b of the cam follower 42 travels through the linear path 140a and the oblique path 140b shown in FIG. 7A and reaches terminal portion 100B, at which point it is prevented from being pressed inward any further. The slider 40 is then pressed forward by the coil spring 182, thereby causing the end portion 42b to travel through the oblique path 140d to come to rest at terminal portion 100C, which is the engagement position The end portion 42b passes over peaks 148 (see FIG. 7B) as it travels through oblique paths 140b and 140d.

As shown in FIG. 10, when the card 250 is completely inserted within the connector 1, the slider 40 moves to its rearwardmost position and a cutout 252 of the card 250 and the lock member 176 are completely engaged. That is, because a surface 252a of the cutout 252, which faces the engagement portion 14, and the engagement surface 177 of the lock member are engaged, the card 250 is in a locked state. At this time, because the free end portion 176c of the lock member 176 is in contact with the support surface 116 of the housing 20, the accidental flexing of the lock member 176 in the lock release direction is prevented, thereby positively engaging the cutout 252 of the card 250 and the lock member 176.

Next, when the card is to be ejected, the end portion 42b is caused to travel to the linear path 140g via the oblique path 140f (see FIG. 7A) by the card 250 being urged again by a finger. When the pressing force is reduced, the card is pushed outward along with the slider 40 by the coil spring 182. At this time, the free end portion 176c of the lock member 176 moves from the support surface 116 of the housing 20 forward, separating therefrom. That is, the free end portion 176c moves toward the engagement portion 14. In other words, in this state, the free end portion 176c is in a state in which it is not supported by the support surface 116. Then, by further extraction of the card 250, the lock member 176 is caused to flex outward, thereby releasing the engagement between the cutout 252 and the lock member 176. The end portion 42b of the cam follower 42 is returned to the terminal portion 100A of the cam groove 100 in the position in which the card 250 has been ejected. In this manner, the connector 1 is capable of both insertion and ejection of the card using solely a pressing operation.

Next, a case in which the card 250 is erroneously pulled out while in a locked state will be described with reference to FIG. 12. The engagement surface 177 of the lock member 176 is pressed toward the ejection direction by the engagement surface 252a of the cutout 252 of the card 250 by the extraction operation thereon. However, because the end portion 42b of the cam follower 42 remains in the terminal portion 100C, the slider 40 is not caused to move in the ejection direction.

Figure 8B:
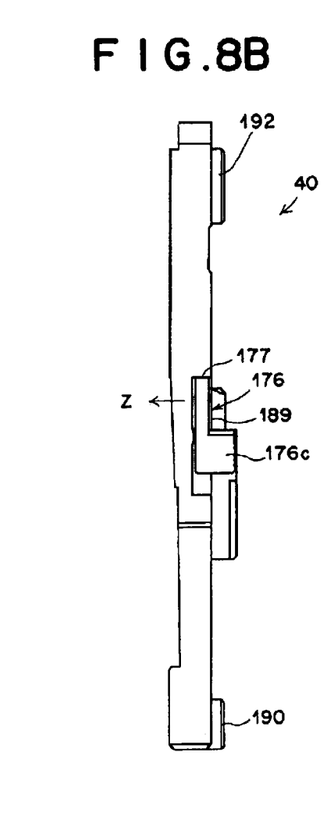
FIG. 8B is a side view of the slider.
Figure 8C:
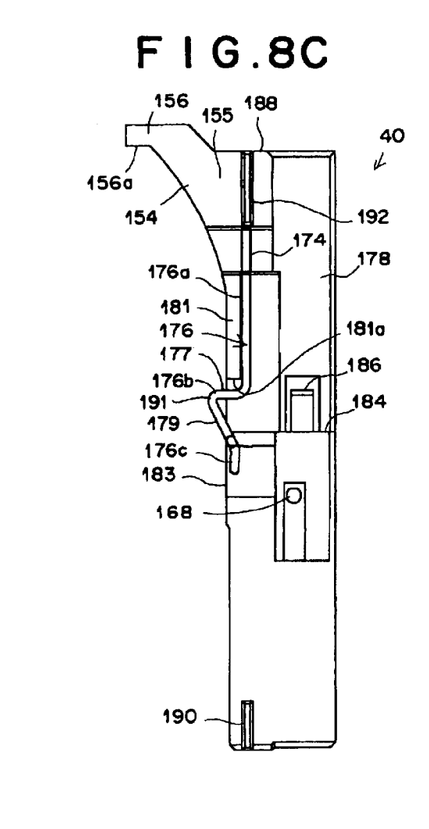
FIG. 8C is a bottom view of the slider.

The important point here is that the portion of the free end portion 176c supported by the support surface of the housing 20 is the portion that protrudes from a bottom surface 189 of the slider 40, as most clearly shown in FIG. 8B, and that the portion that engages the cutout 252 of the card 250 is the engagement surface 177. That is, it is important to note that the protruding portion of the free end portion 176c and the engagement surface 177 are offset in the width direction of the lock member 176. By this construction, when a force for extraction is applied to the engagement surface 177, the shape of the engagement protrusion 176b deforms slightly while twisting around the fixed end portion of the lock member 176 in the direction indicated by the arrow Z in FIG. 8B. By this twisting, the protrusive height of a peak 191 of the engagement protrusion 176b is reduced, and the engagement of the cutout 252 of the card 250 therewith is released, allowing extraction of the card 250. FIG. 12 shows a state in which this engagement has been released.

As has been described above, the connector according to the present invention, although the card 250 and the lock member 176 are engaged with high retention force, does not damage the card or lock member in when the card is forcefully extracted while in a locked state.

Although a preferred embodiment has been described, the present invention is not limited to the construction of the embodiment described above. For example, the cam follower 42 may be attached to the housing 20 in a manner so that it is urged towards the cam groove 100 by itself.

What is claimed is:

1. A card connector comprising:
   an insulative housing with a plurality of contacts for receiving a card;
   a slider slidably mounted in said housing and being movable between an ejection position for ejecting said card from said housing and a card receiving position for receiving said card in said housing;
   a lock member held by and being movable along with said slider for engaging a cutout on a lateral edge of said card to lock said card in said card receiving position, said lock member comprises a fixed end portion fixed on said slider;
   a positioning mechanism for positioning said slider in said ejection position and said card receiving position;
   a free end portion being supported by contacting a support surface of said housing when in said card receiving position and being separated from said support surface when in said ejection position; and
   a spring piece with an engagement protrusion for engaging said cutout; wherein
   when said slider is in said ejection position, said free end portion flexes to disengage the engagement with said cutout of said card by the extraction of said card; and
   when said slider is in said card receiving position, said free end portion elastically deforms while contacting said support surface to disengage the engagement with said cutout by the forced extraction of said card.

2. The card connector as defined in claim 1, wherein:
   said free end portion of said lock member is a tongue for contacting said support surface;

said engagement protrusion engages with the engagement surface of said lock member;

said tongue piece and said engagement surface are disposed closer to one side in the width direction of said spring piece; and said engagement protrusion elastically deforms in a twisting manner around said fixed end portion when it receives said forced extraction force to disengage the engagement with said cutout.

3. The card connector of claim 2, wherein said positioning mechanism includes a cam groove formed on said housing and a cam follower structured to move in said cam groove according to the movement of said slider.

4. A card connector comprising:

an insulating housing having a plurality of contacts for receiving a card;

a slider being movable between card release and card engagement positions;

a lock member having a fixed end portion being fixed to the slider and an engagement protrusion that engages the card;

a positioning mechanism that moves the lock member between a card release position and a card engagement position and secures the lock member in the card engagement position;

the lock member having a portion that elastically deforms to disengage from the card when the lock member is secured in the card engagement position and the card is forcibly extracted; and a compression spring that moves the lock member between the card release position and the card engagement position.

5. The card connector of claim 4, wherein the positioning mechanism includes a cam follower positioned in a groove in the housing.

6. The card connector of claim 4, further comprising tongues that engage an outer surface of the card to prevent the card from ejecting at an excessive speed.

7. The card connector of claim 4, wherein the lock member is formed from a metal plate.

8. The card connector of claim 4, wherein the lock member deforms by twisting to disengage from the card.

9. The card connector of claim 4, wherein the lock member includes a free end portion that moves away from the card to disengage the engagement protrusion from the card when the lock member is in the card release position.

10. The card connector of claim 9, wherein the housing includes a support surface that supports the free end portion in the card engagement position.

11. The card connector of claim 9, wherein the free end portion and the engagement protrusion are offset in a width direction of the lock member.

12. The card connector of claim 4, wherein the slider is attached to the positioning mechanism that moves the lock member between the card release position and the card engagement position.

13. The card connector of claim 12, wherein the positioning mechanism includes a cam groove formed on the housing and a cam follower structured to move in the cam groove according to the movement of the slider.

14. The card connector of claim 13, wherein the cam groove includes a plurality of linear paths and oblique surfaces that guide the cam follower through the linear paths.

15. A card connector comprising:

an insulating housing having a plurality of contacts for receiving a card;

a slider being movable between card release and card engagement positions;

a lock member having a fixed end portion being fixed to the slider and an engagement protrusion that engages the card;

a positioning mechanism that moves the lock member between a card release position and a card engagement position and secures the lock member in the card engagement position;

the slider being attached to the positioning mechanism that moves the lock member between the card release position and the card engagement position;

the lock member having a portion that elastically deforms to disengage from the card when the lock member is secured in the card engagement position and the card is forcibly extracted; and a compression spring that urges the slider toward the card release position.

16. A card connector comprising:

an insulating housing having a plurality of contacts for receiving a card;

a slider being movable between card release and card engagement positions;

a lock member having a fixed end portion being fixed to the slider and an engagement protrusion that engages the card;

a positioning mechanism that moves the lock member between a card release position and a card engagement position and secures the lock member in the card engagement position;

the lock member having a portion that elastically deforms by twisting to disengage from the card when the lock member is secured in the card engagement position and the card is forcibly extracted; and a compression spring that urges the slider toward the card release position.

17. The card connector of claim 16, further comprising tongues that engage an outer surface of the card to prevent the card from ejecting at an excessive speed.

18. The card connector of claim 16, wherein the lock member is formed from a metal plate.

* * * * *